United States Patent
Gong et al.

(10) Patent No.: US 7,468,896 B2
(45) Date of Patent: Dec. 23, 2008

(54) DRIVE CIRCUIT FOR A SWITCH IN A SWITCHING CONVERTER

(75) Inventors: Xiao-Wu Gong, Singapore (SG); Huang Heng Cheong, Singapore (SG); Chan Tuck Meng, Singapore (SG)

(73) Assignee: Infineon Technologies AG, Munich (DE)

( * ) Notice: Subject to any disclaimer, the term of this patent is extended or adjusted under 35 U.S.C. 154(b) by 427 days.

(21) Appl. No.: 11/250,165

(22) Filed: Oct. 13, 2005

(65) Prior Publication Data

US 2006/0093017 A1 May 4, 2006

(30) Foreign Application Priority Data

Oct. 13, 2004 (EP) .................................. 04024395

(51) Int. Cl.
*H02M 3/335* (2006.01)
(52) U.S. Cl. .................................. 363/21.17; 363/21.12
(58) Field of Classification Search .................. 363/16, 363/20, 21.01, 21.12, 12.13, 21.15, 21.17, 363/49, 55, 56.01, 95, 97, 131
See application file for complete search history.

(56) References Cited

U.S. PATENT DOCUMENTS 4,433,369 A 2/1984 Noro
5,455,757 A * 10/1995 Nguyen et al. ........... 363/21.16

(Continued)

FOREIGN PATENT DOCUMENTS

DE 195 08 468 A1 6/1996

OTHER PUBLICATIONS

CoolSET-F2, Datasheet v4.4, Dec. 2003, Infineon Technologies AG, Munich, pp. 1-33, (33 pages).

(Continued)

*Primary Examiner*—Matthew V Nguyen
(74) *Attorney, Agent, or Firm*—Maginot, Moore & Beck

(57) ABSTRACT

A drive circuit for activating a switch in a switching converter, which has output Terminals for providing an output voltage, and in which a feedback signal that varies with the output voltage is available. The drive circuit comprises: a capacitive storage element, a charging/discharging circuit connected to a first terminal of the capacitive storage element, to which at least one load signal is fed, that adopts at least a first and second state according to at least one control signal, and which is designed in such a way to charge the capacitive storage element cyclically in the first state up to a first limit value and to discharge it until it reaches a second limit value, and in the second state to only charge the capacitive storage element, a load signal generation circuit to which the feedback signal is fed and which produces at least one load signal, at least one operating mode circuit to which a charge state signal, which varies with the charge state of the capacitive storage element, and the first control signal are fed, and which is designed to set an initial operating state of the drive circuit (100) in accordance with the aforementioned input signals, an oscillator circuit to which the charge state signal is fed, and which provides an oscillating signal with a frequency that varies according to the charge state signal, a drive signal generation circuit to which the oscillating signal and the feedback signal are fed, and which provides the drive signal.

20 Claims, 10 Drawing Sheets

U.S. PATENT DOCUMENTS

| | | | |
|---|---|---|---|
| 5,570,279 | A | 10/1996 | Venkataramanan |
| 5,771,159 | A | 6/1998 | Sako et al. |
| 5,903,452 | A * | 5/1999 | Yang ........................ 363/97 |
| 6,115,267 | A | 9/2000 | Herbert |
| 6,385,060 | B1 | 5/2002 | Basso et al. |
| 6,977,825 | B2 * | 12/2005 | Robinson, Jr. ........... 363/21.17 |
| 7,116,564 | B2 * | 10/2006 | Takahashi ................ 363/21.16 |
| 7,330,361 | B1 * | 2/2008 | Chu et al. ................ 363/21.12 |

OTHER PUBLICATIONS

TOP242-250 TOPSwitch-GX Family, Nov. 2005, Power Integrations, pp. 1-52, (52 pages).

"Application Note 4116, A Fairchild Power Switch (FPS) Based on Switched Mode Power Supply for LCD Monitor Use", Rev. 1.0.0, 2002, Fairchild Semiconductor Corporation, pp. 1-11, (11 pages).

* cited by examiner

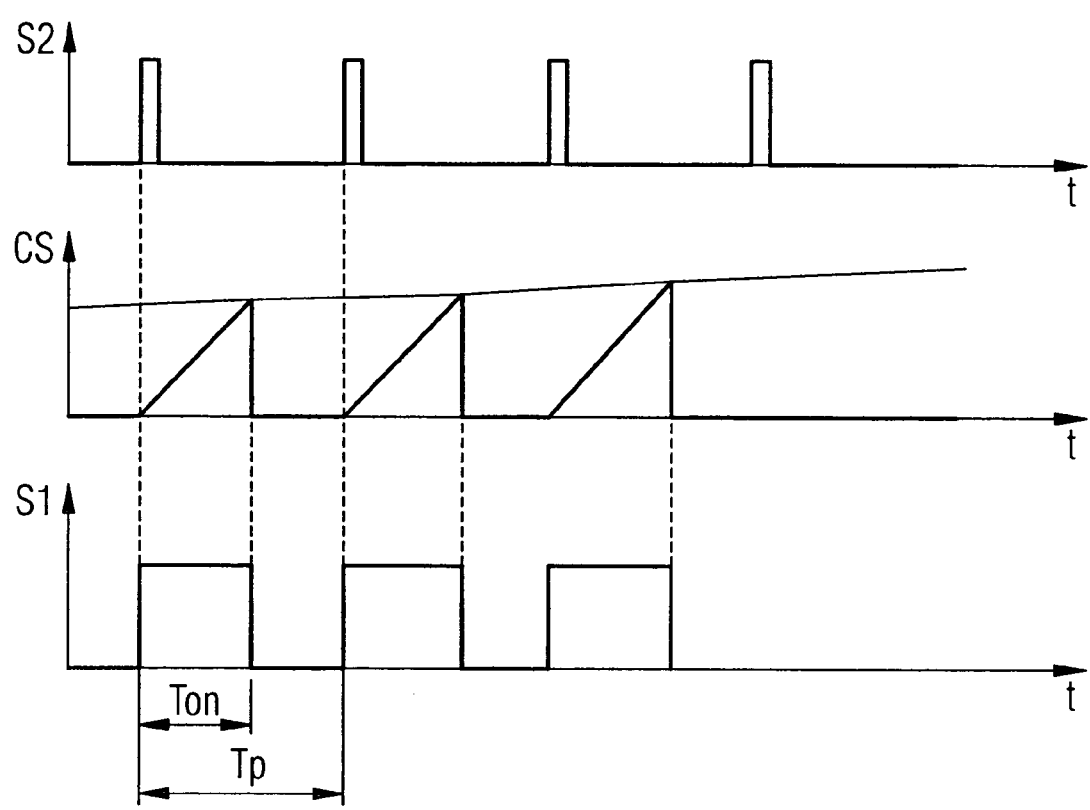

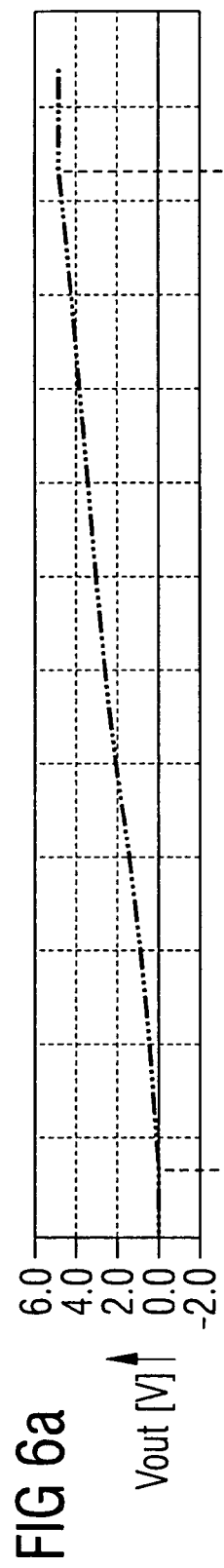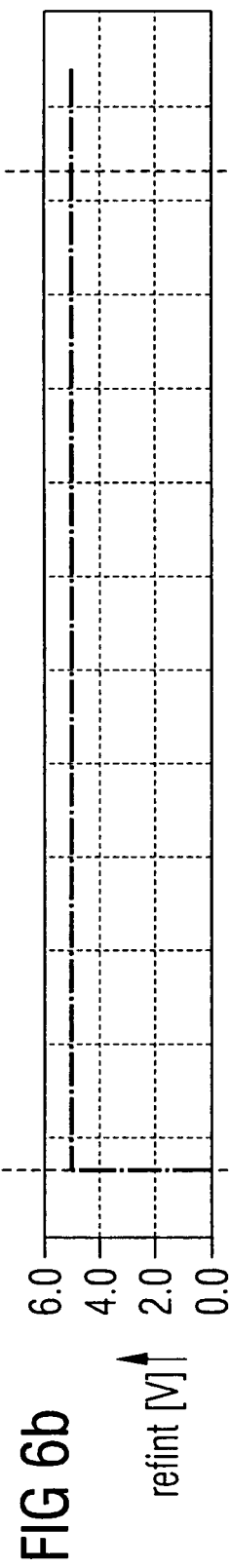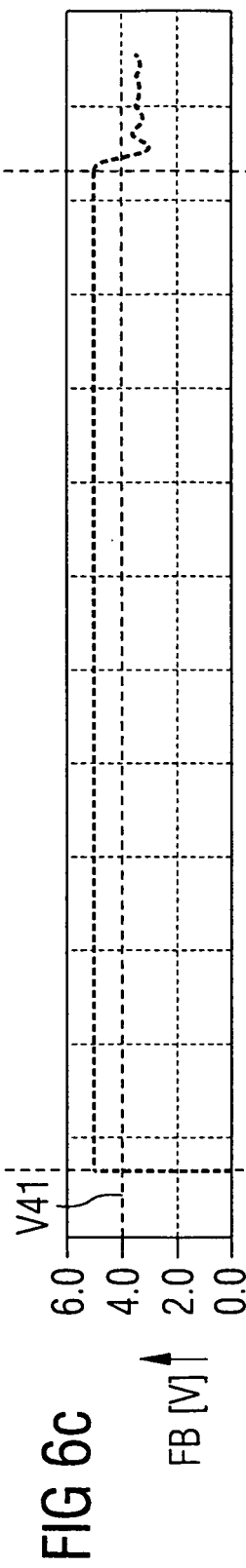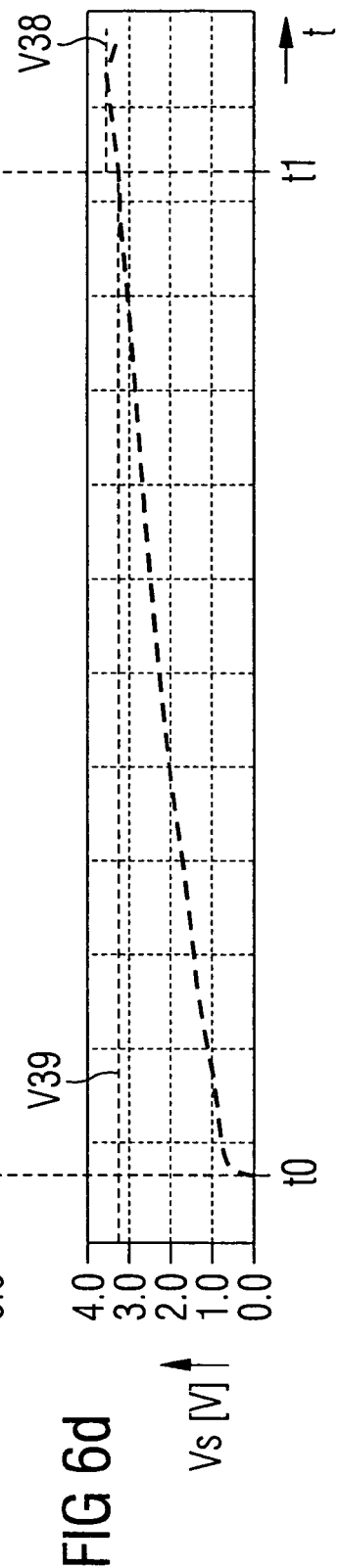

FIG 8
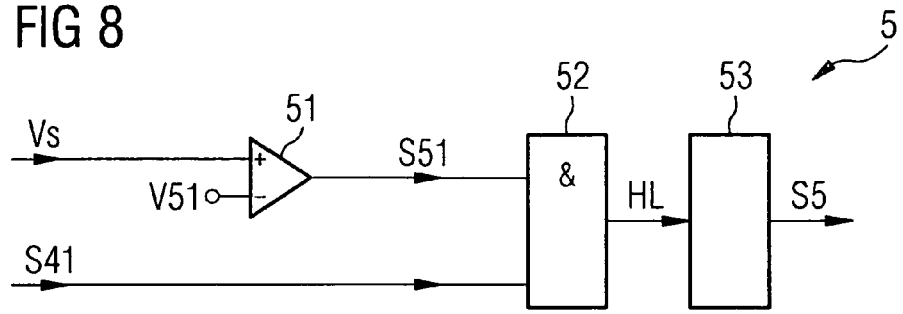
FIG 9a
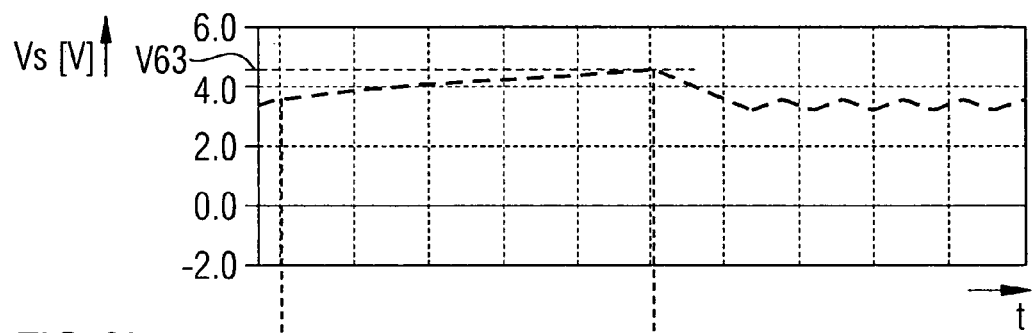
FIG 9b
FIG 9c
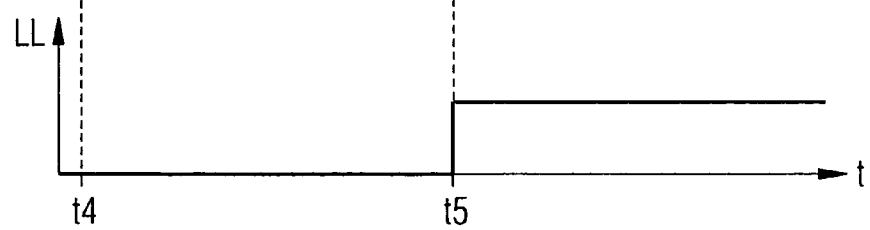

DRIVE CIRCUIT FOR A SWITCH IN A SWITCHING CONVERTER

FIELD OF THE INVENTION

The invention refers to a drive circuit for a switch controlling the power input of a switching converter, particularly for a switch in a switching converter operating in the so-called current mode.

BACKGROUND

The use of switching converters is well known for converting an input voltage to a controlled output voltage for supply of a consumer. The power input, and consequently the output voltage, is controlled using a switch driven by a pulse width-modulated drive signal, and which is normally connected in series with an inductive energy storage element. To generate the pulse width-modulated signal, current mode switching converters (CM converters) use a feedback or control signal that varies with the output voltage, and a current measuring signal that is dependent on the current through the switch.

An example of a drive circuit for a switch in a CM converter of this kind is described in "CoolSET™-F2", Datasheet V4.4, December 2003 from Infineon Technologies AG, Munich. This drive circuit has a so-called soft start function, which is implemented using a capacitor connected to the drive circuit. When restarting the switching converter, when the output voltage is still zero and the capacitor is not charged, the capacitor is charged under defined conditions to a specified voltage to create a limiting signal with a rising signal characteristic. The limiting signal is used during the startup phase to limit the current through the switch controlling the power input. To this end, a current measuring signal dependent on the current through the switch is compared with the limiting signal, and the switch is opened independently of the output voltage whenever the current measuring signal—which rises after activation of the switch—reaches the value of the limiting signal. Due to the rise in the level of the limiting signal over time, the current limiting value also rises over time and the activation periods of the switch are extended, which has the effect of producing a 'gentle' startup phase for the switching converter. The current measuring signal compared with the limiting signal during startup and with the feedback signal during normal operation may result from the voltage across a current sense resistor plus an offset to achieve improved startup conditions.

A drive circuit with soft start functionality for a switch in a CM switching converter is also described in the "Application Note 4116, A Fairchild Power Switch (FPS) based on Switched Mode Power Supply for LCD Monitor Use", Rev. 1.0.0, 2002, Fairchild Semiconductor Corporation. The soft start function is also implemented in this instance using a capacitor that is charged after activation of the switching converter to produce a rising limiting signal. This drive circuit also has an overload protective circuit that prevents activation of the switch whenever overloading is detected. The overload detection functions by comparing the feedback signal with a specified limit value. An overload situation is assumed to exist if the feedback signal exceeds the limit value. To prevent the protection circuit from being triggered by brief rises in the feedback signal, there is a further capacitor, which is connected to the feedback branch. This capacitor provides a delay between the rise in the feedback signal and the activation of the protection circuit.

The disadvantage of this method is that the presence of the capacitor in the feedback path affects the control properties of the overall system and that the additional capacitor has to be designed as an external component, which represents a cost factor that has to be considered.

A drive circuit for a switch in a CM switching converter is also described in "TOP 242-250, TOPSwitch™-GX Family", March 2004, Power Integrations. This drive circuit allows the switching frequency of the pulse width-modulated signal to be varied in order to enhance the electromagnetic compatibility. The switching frequency for the circuit varies between 128 kHz and 136 kHz. The frequency at which the switches take place is 250 Hz.

SUMMARY

The objective of the method described in this paper is to provide a drive circuit for a switch in a switching converter, one that is easy and inexpensive to implement, that has a soft start function when the switching converter starts up and is protected against overload, and that provides electromagnetic-compatible driving of the switch.

The objective is achieved by a drive circuit according to embodiments of the invention.

A drive circuit for activating a switch in a switching converter, which has output terminals for providing an output voltage, and in which a feedback signal that varies with the output voltage is provided, include the following:
  a capacitive storage element,
  a charging/discharging circuit connected to a first terminal of the capacitive storage element, to which at least an initial load signal is fed, that adopts at least a first and second state according to at least one control signal, and which is designed in such a way to charge the capacitive storage element cyclically in the first state up to a first limit value and to discharge it until it reaches a second limit value, and in the second state to only charge the capacitive storage element,
  a load signal generation circuit to which the feedback signal is fed and which produces at least one load signal,
  at least one operating mode circuit to which a charge state signal, which varies with the charge state of the capacitive storage element, and the first control signal are fed, and which is designed to set an initial operating state of the drive circuit in accordance with these input signals,
  an oscillator circuit to which the charge state signal is fed, and which provides an oscillating signal with a frequency that varies according to the charge state signal,
  a drive signal generation circuit to which the oscillating signal and the feedback signal are fed, and which provides the drive signal.

BRIEF DESCRIPTION OF THE DRAWINGS

The invention claimed is explained in greater detail in the following examples with respect to figures.

Figure 1:
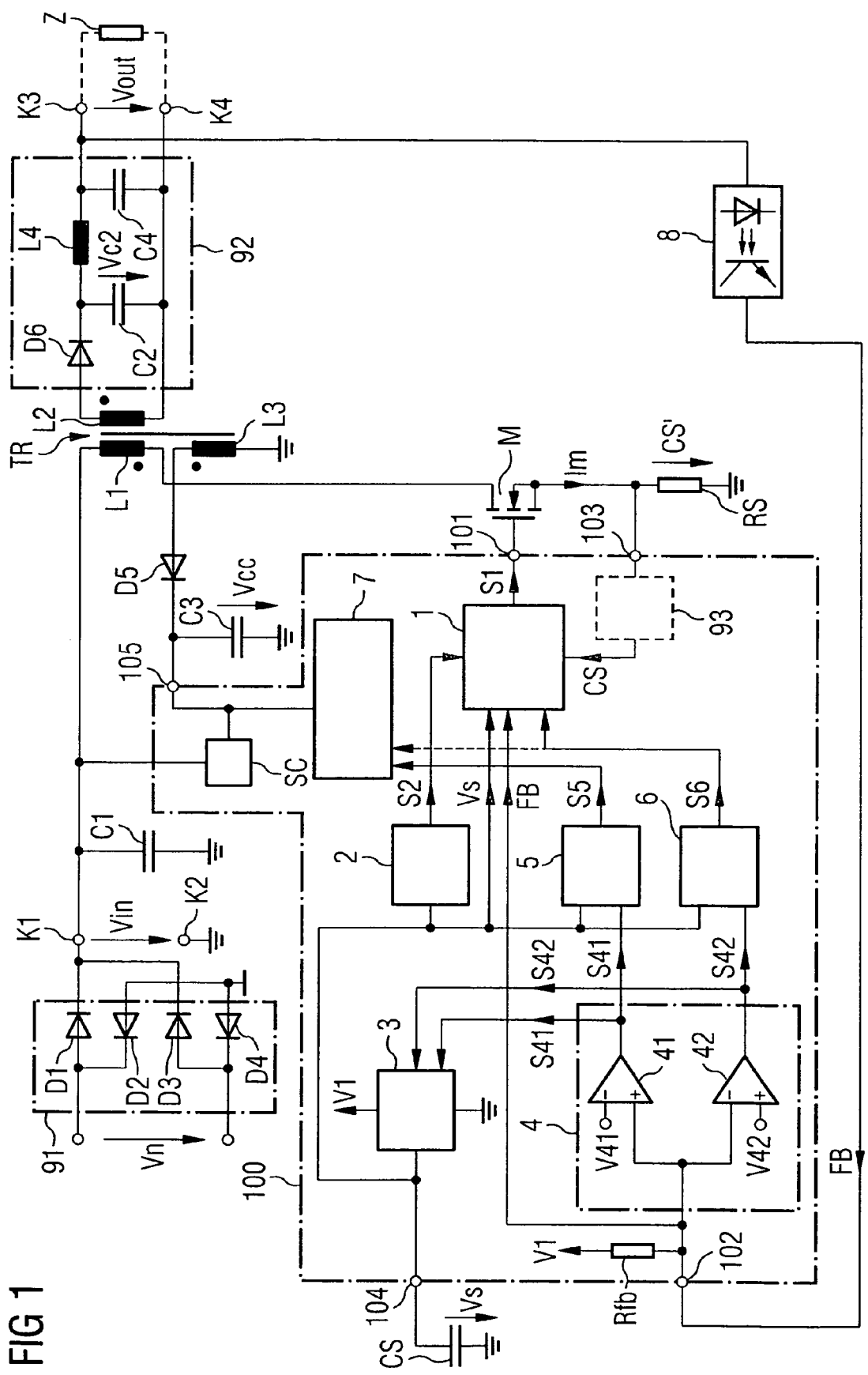

FIG. 1 illustrates a switching converter with a switch and a drive circuit for the switch compliant with the claims of the invention.

FIG. 2 schematically illustrates the timing of an oscillator signal, a current measuring signal and a drive signal is depicted in order to explain the operating principle of the signal generation circuit.

FIG. 3 schematically illustrates a first operating mode circuit of the drive circuit.

Figure 4:
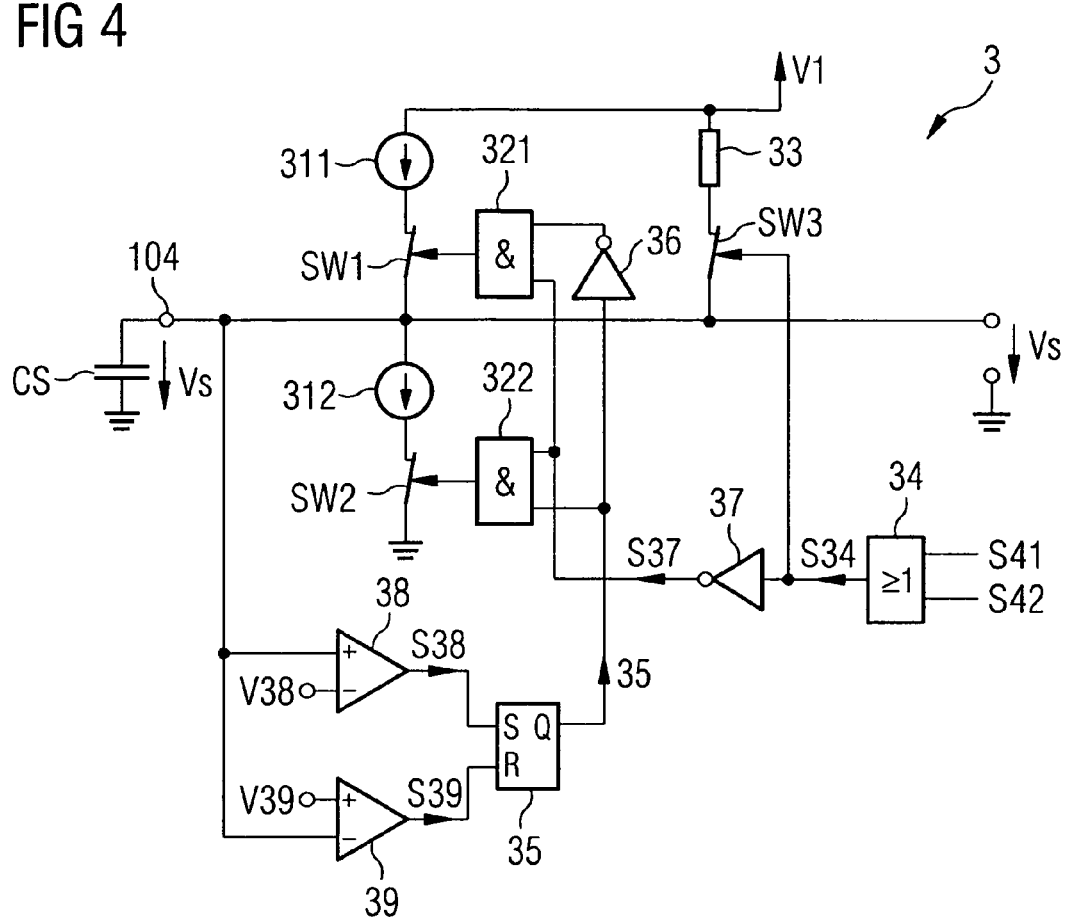

FIG. 4 schematically illustrates a charging/discharging circuit for a capacitive storage element of the drive circuit.

Figure 5:
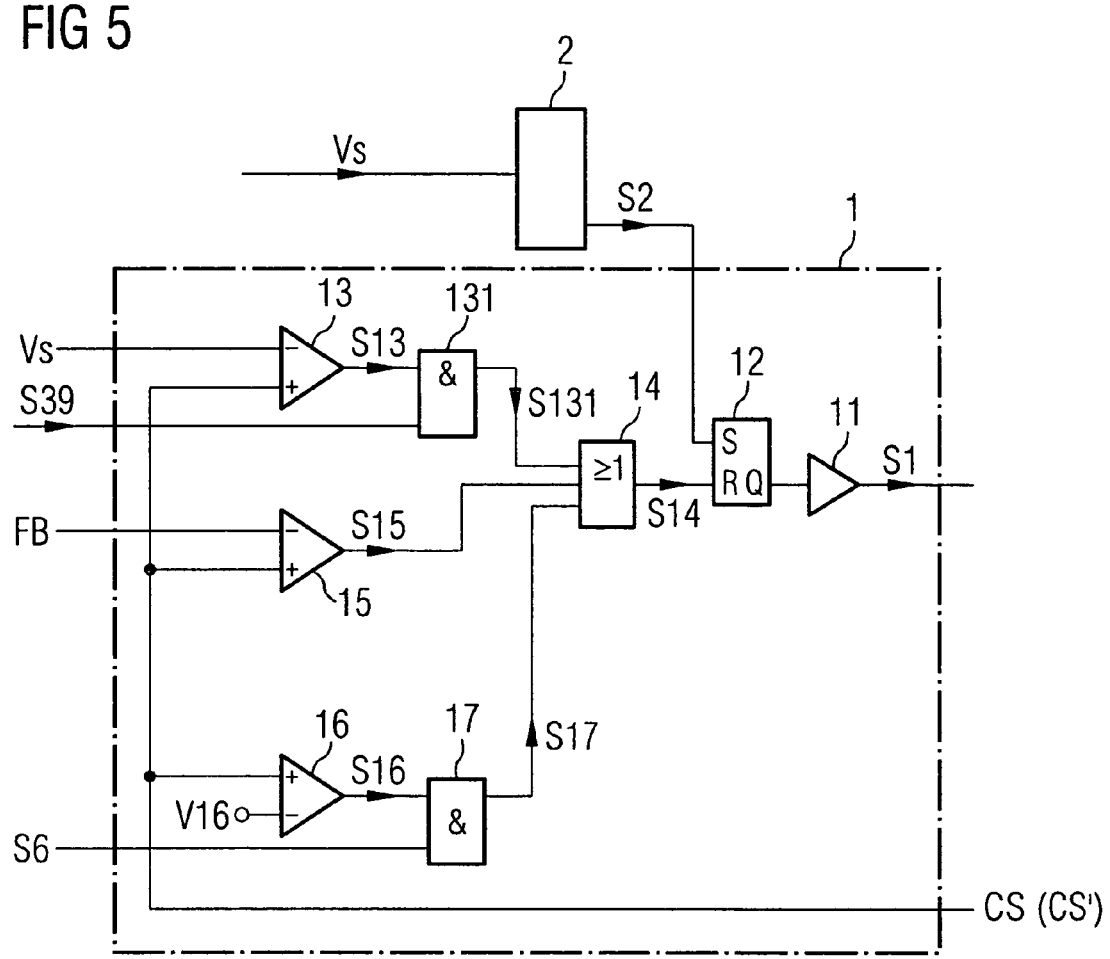

FIG. 5 shows a signal generating circuit for generating the drive signal.

FIG. 6 schematically illustrates the timing of the output voltage, the voltage across the capacitive storage element and the feedback signal in order to illustrate the soft ramp up of the voltage across the capacitive storage element and ramp up and ramp down of this voltage for EMI issue.

Figure 7A:
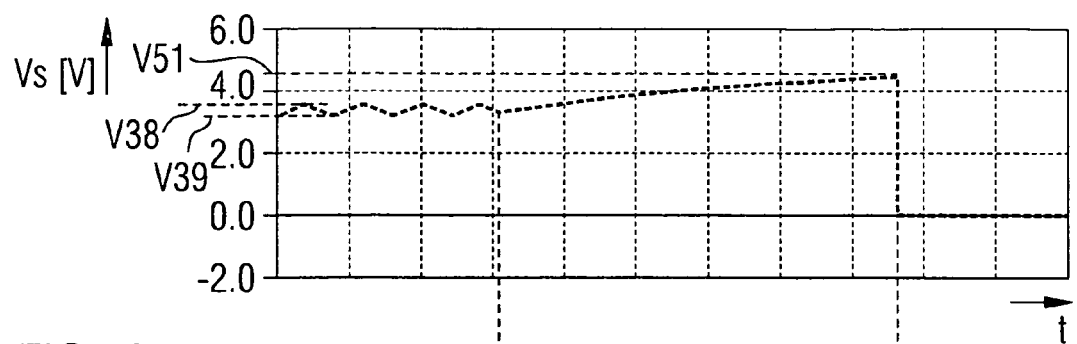

FIG. 7 schematically illustrates the timing of the voltage across the capacitor and the feedback signal in order to illustrate the overload and open loop detection feature.

FIG. 8 illustrates a first operating mode circuit.

FIG. 9 illustrates the timing of the voltage across the capacitor and the feedback signal in order to illustrate a burst mode of the system.

Figure 10:
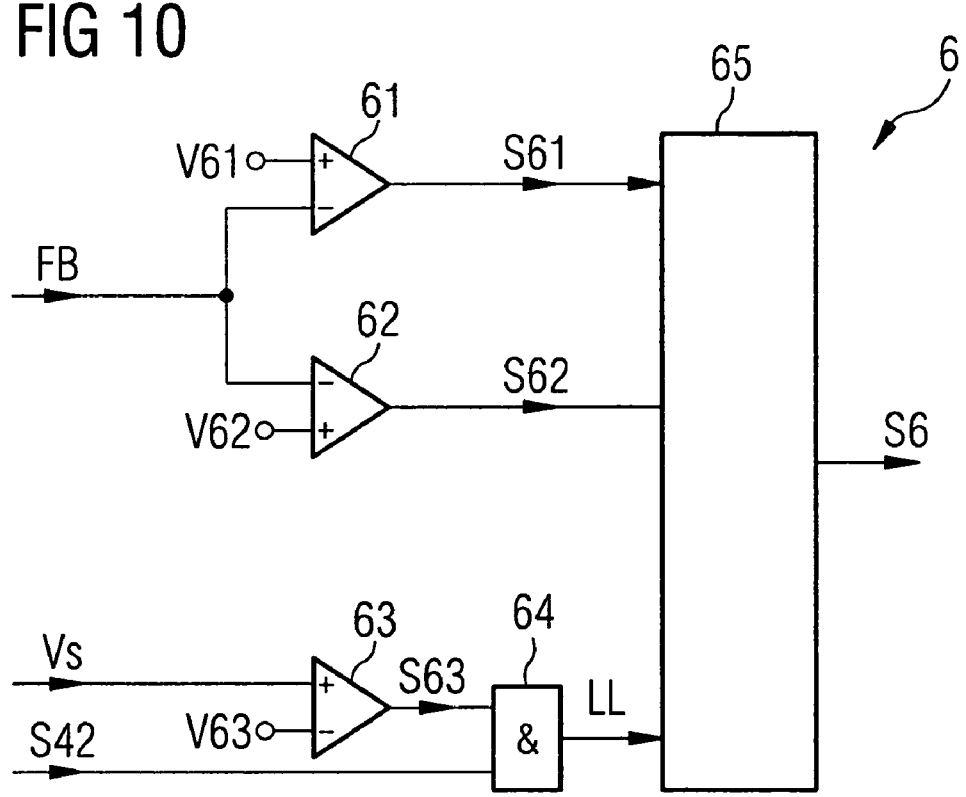

FIG. 10 illustrates a second operating mode circuit.

Figure 11:
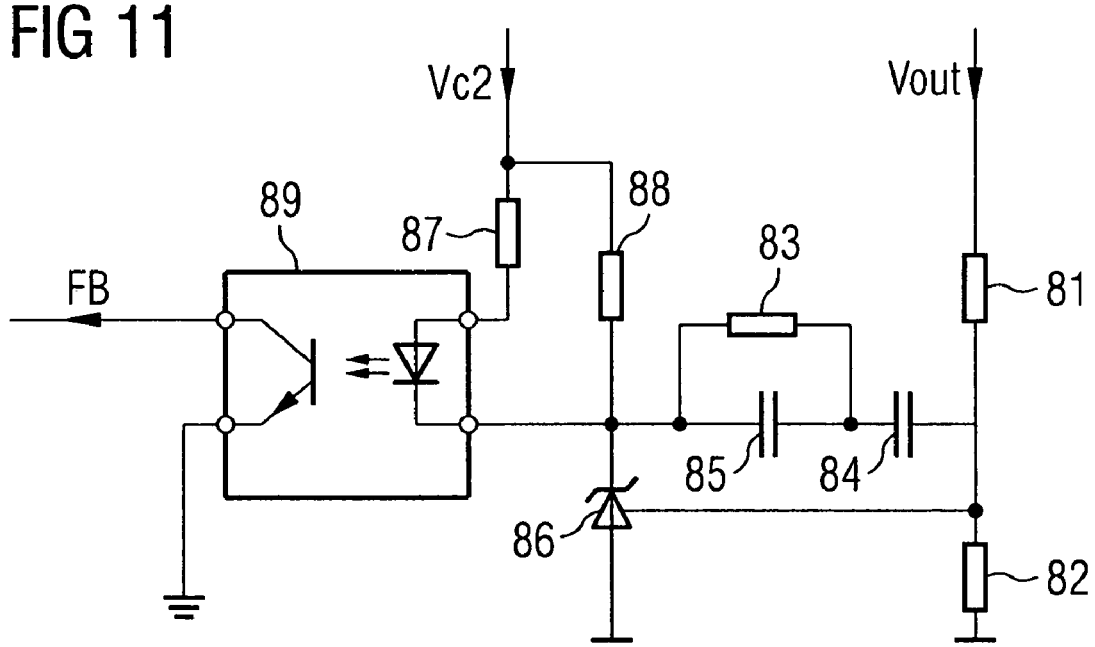

FIG. 11 illustrates a circuit implementation of the feedback circuit.

Figure 12:
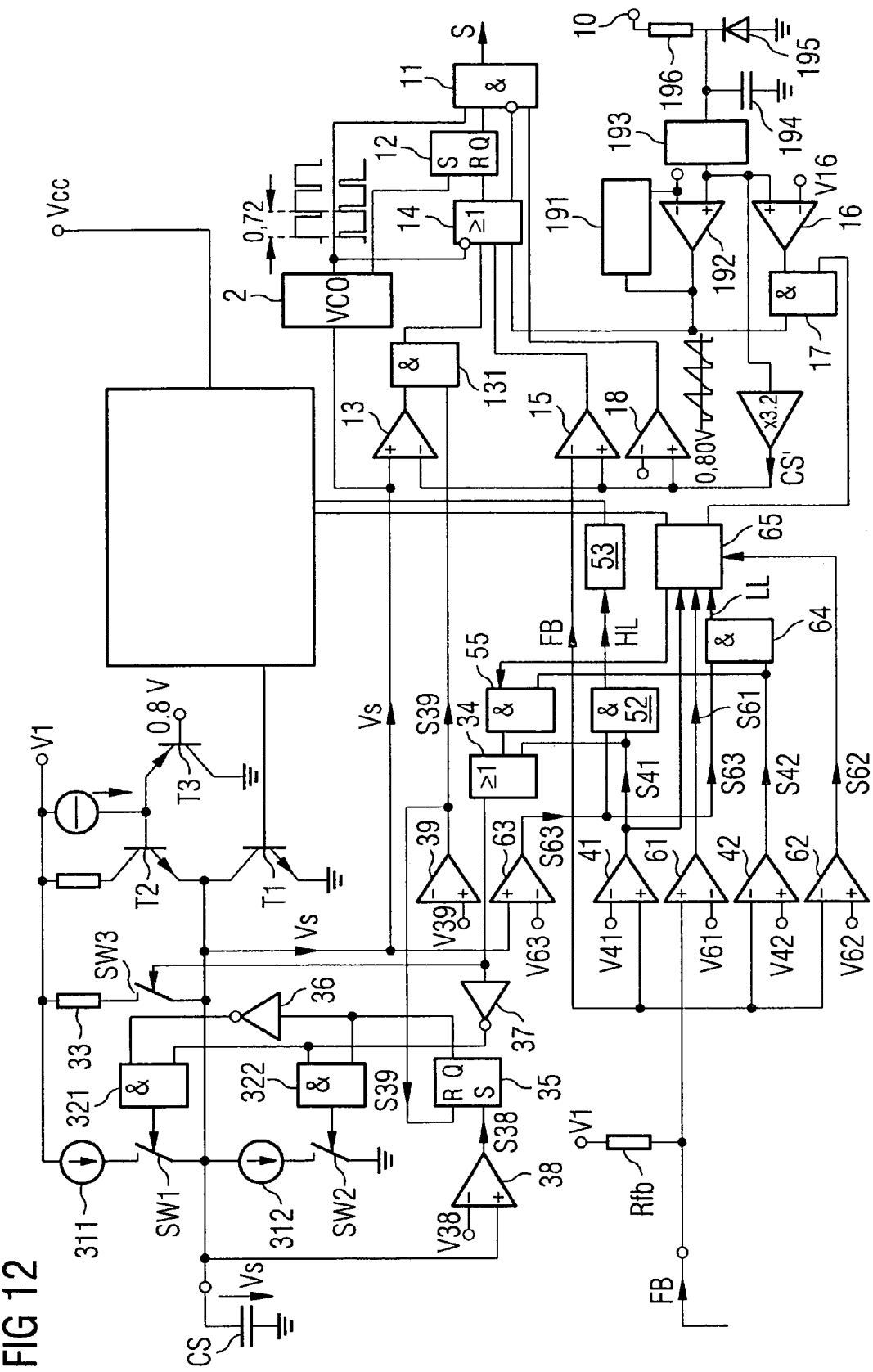

FIG. 12 illustrates a further example of the drive circuit.

Unless otherwise stated, the reference signs in the figures indicate the same parts with the same meaning.

DETAILED DESCRIPTION

FIG. 1 shows the first example of an embodiment of a drive circuit 100 for driving a switch M in a switching converter and providing a drive signal 81 at a first terminal 101. For better understanding of the operation of the drive circuit 100, in addition to the drive circuit 100, FIG. 1 shows the other circuit components of the switching converter. The components are described in brief below.

The switching converter includes input terminals K1, K2 for applying an input voltage Vin, which in this example is generated from an a.c. voltage supply—for example, a mains a.c. power supply Vn—using a bridge rectifier 91 with four diodes D1 . . . D4. An input capacitor C1 connected between the input terminals K1, K2 is used to smooth the input voltage Vin. The converter shown is designed as a blocking converter and includes a transformer TR with a primary coil L1 and secondary coil L2, in which the primary coil L1 is connected in series to a load path of the switch implemented in the example as a MOSFET M and to a current sensing resistor Rs. This series circuit, consisting of the primary coil L1, the switch M and the current sensing resistor Rs is connected between the input terminals K1, K2. On the secondary side, the switching converter consists of a rectifier circuit 92, which is connected to the secondary coil L2, and has output terminals K3, K4 for providing an output voltage Vout. This output voltage Vout is used for supplying power to a load Z, which is illustrated by a dashed line. The rectifier circuit 92 consists of a diode D6, which is connected in series with the secondary coil L2, and an initial capacitor C2 connected parallel to the series circuit of the secondary coil L2 and the diode D6. Connected in parallel to the first capacitor C2 is an LC element with an inductor L4 and a second capacitor C4; the output voltage Vout is found at this second capacitor C4.

To supply power to the drive circuit 100, the transformer TR has an auxiliary winding L3 connected inductively with the primary coil L1. The auxiliary winding L3 feeds a power supply capacitor C3 through a diode D5. The capacitor C3 provides a supply voltage Vcc for the drive circuit 100. The power supply capacitor C3 is connected to one of the input terminals K1 through a start up cell SC. The start up cell SC enables the switching converter to start up by securing the power supply of the drive circuit 100 before the switch M is closed for the first time.

The function of the drive circuit 100 is to provide a pulse width-modulated drive signal S1 for the switch M in such a way that the output voltage Vout assumes an approximate constant value in normal operating state independently of the connected load Z. The input power of the switching converter, and consequently also the output voltage Vout is controlled using the duty cycle of the pulse width-modulated signal S1, which drives the switch M. When the switch M is closed, the primary coil L1 receives energy through the input terminals K1, K2 and passes it on to the rectifier circuit 92 and the load Z via the secondary coil L2 when the switch M subsequently opens. The longer the switch M is activated during a drive period (i.e., the greater the duty cycle of the drive signal S1), the greater the input power.

The drive circuit 100 shown in FIG. 1 is designed to generate pulses of the drive signal S1 synchronously to an oscillating signal S2 provided by an oscillator circuit 2. The activation time, and therefore the duty cycle, is set in response to a feedback signal FB and a current measuring signal CS. The feedback signal FB varies with the output voltage Vout and is provided at the output of a feedback path, which is connected to one of the output terminals K3 and which comprises a feedback circuit 8. The feedback circuit 8 consists, for example, of a filter and an optocoupler. The optocoupler is used for potential insulation between the primary and secondary sides of the switching converter. The feedback signal FB is fed to a second terminal 102 of the drive circuit 100 and to a signal generation circuit 1 in the drive circuit 100 that generates the drive signal S1. The current measuring signal CS is fed to a third terminal 103 of the drive circuit 100, and also to the signal generation circuit 1 in the drive circuit 100. The current measuring signal CS may correspond to the voltage CS' at the current measuring resistor Rs, which is connected in series to the switch M. As a consequence, the current measuring signal CS would directly be proportional to a load current Im flowing through the switch M.

The current measuring signal CS may also result from the voltage CS' across the current measuring resistor Rs by $$CS = A + B \cdot CS' \quad (1)$$

wherein A and B are constant factors, for example A=0.6V and B=3.2. The current measuring signal in this case is not directly proportional to the voltage across current sensing. resistor. Obtaining the current measuring signal CS using equation (1) results to an improved current being described in the above CoolSET™-F2 data sheet. An optional calculation unit 93 (which is depicted in dashed lines in FIG. 1) calculates the current measuring signal CS from the voltage across the current sense resistor Rs.

In the following signal CS in both cases will be denoted current measuring signal.

The signal generation circuit 1 is designed in such a way that it generates the drive signal S1 during normal operation so that the switch M is activated with the clock of the oscillating signal S2, and deactivated when the current measuring signal CS—which rises after activation of the switch M—has risen to the value of the feedback signal FB. This operating principle of the signal generation circuit 1 is depicted in FIG. 2 using the timing behavior of the oscillating signal S2, the feedback signal FB and the current measuring signal CS. As can be seen, the activation period Ton increases with the rising feedback signal FB. As a result, the duty cycle (which corresponds to the ratio of the activation period Ton and the period Tp given by the oscillator signal) also rises.

The feedback signal FB is generated by the feedback circuit 8 in such a way that the value of the feedback signal FB rises in inverse proportion to the output voltage Vout in order to increase the activation period of the switch M when the output voltage Vout is low, thereby increasing the input power and counteracting further drops in the output voltage Vout, or to set the output voltage Vout to a defined reference value.

The feedback signal FB supplies information on the load state and, under large loads, assumes a high value if the output voltage Vout sinks at least for a while. Under low loads, the feedback signal FB assumes a low value if the output voltage Vout rises at least for a while.

If a fault occurs during operation of the switching converter which causes the feedback signal FB path to be interrupted, the feedback signal FB applied to a second terminal 102 is pulled up to the value of an internal supply potential V1 using an ohmic resistance Rfb. The internal supply potential V1 provides the maximum value of the feedback signal FB, also during normal operation. The value of the feedback signal FB during an interruption of the open loop as described corresponds to the value of the feedback signal FB under very large loads. In both cases, further driving of the switch M should be interrupted to ensure overload protection, which is explained further below.

The drive circuit 100 consists of an evaluation circuit 4, to which the feedback signal FB is fed. In the example shown, the evaluation circuit 4 generates a first and second load signal S41, S42 that vary with the feedback signal FB. The first load signal S41 is used in the example to indicate an overload and an open feedback loop. This first load signal
S41 is generated using a comparator 41, to whose plus terminal the feedback signal FB is fed, and to whose minus terminal an initial load limit V41 is fed in the form of a reference voltage. This first load limit value V41 is selected in such a way that the feedback signal FB during normal operation—i.e., under a load in the rated range and with the feedback loop closed, does not reach the value of the first load limit V41. The first load signal S41 assumes a high level in the example if the feedback signal FB exceeds the first load limit V41 in order to signal overloading of the switching converter or an open loop.

The first load signal S41 also switches to the high level during a startup phase of the switching converter when the output voltage Vout is initially still zero or very low, and the feedback signal FB correspondingly assumes a value above the first load limit V41. The first load signal S41 is fed in an initial operating mode circuit 5 to the drive circuit 100, and serves as an initial criterion in the decision by the initial operating mode circuit 5 to switch the drive circuit 100 or switching converter to a defined operating state—this is explained further below.

The evaluation circuit 4 consists of another comparator 42, to whose minus input the feedback signal FB is fed, and to whose plus input a second load limit value V42 in the form of a reference voltage is fed. A second load signal S42 is applied to the output of the second comparator 42 to indicate a very small load on the switching converter—for example, in the standby mode of a connected load. The second load limit value V42 is selected in such a way that the feedback signal FB only drops below the value of the second load limit value V42 while under a very low load on the switching converter in order to generate a high level in the second load signal S42.

A capacitive storage element Cs embodied as a capacitor is connected to the drive circuit 100 at a fourth terminal 104. A voltage Vs can be tapped at the capacitor Cs to indicate its charge state; this voltage is referred to hereafter as the charge state signal Vs. The capacitor 104 is connected with its terminal facing away from the connection to a reference potential on the primary side. The input voltage Vin and the current measuring signal CS also refer to this reference potential. A charging/discharging circuit 3 is connected to the capacitor Cs and switched between the internal supply potential V1 and the reference potential on the primary side. The first and second load signals S41, S42 are fed to the charging/discharging circuit 3. This charging/discharging circuit 3 is designed to drive the capacitor Cs in different ways according to the load state indicated by the first and second load signals S41, S42.

Figure 3A:
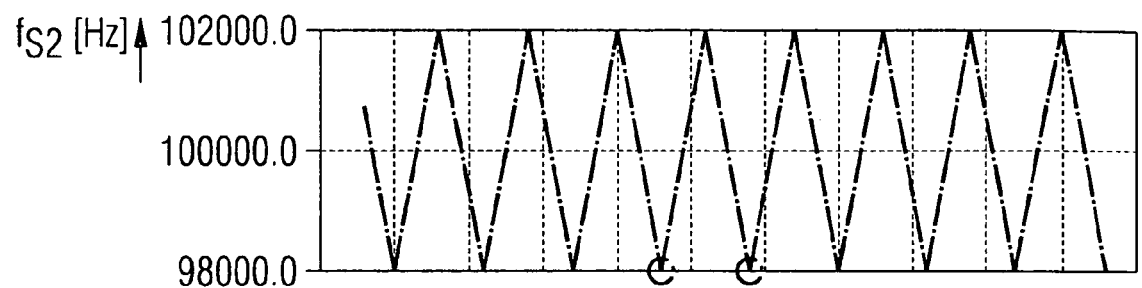
Figure 3B:
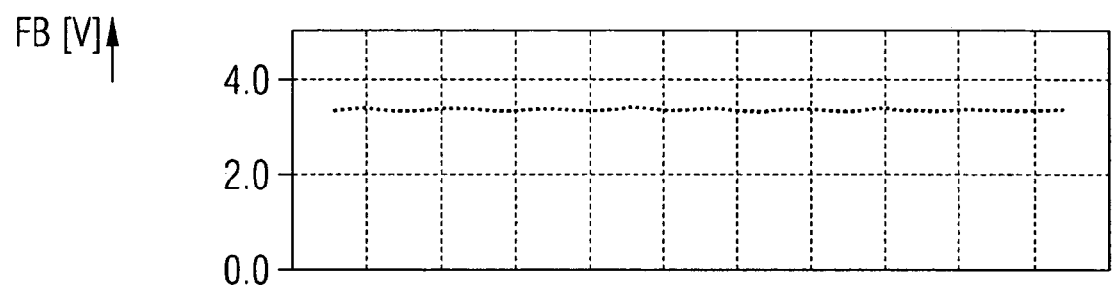
Figure 3C:
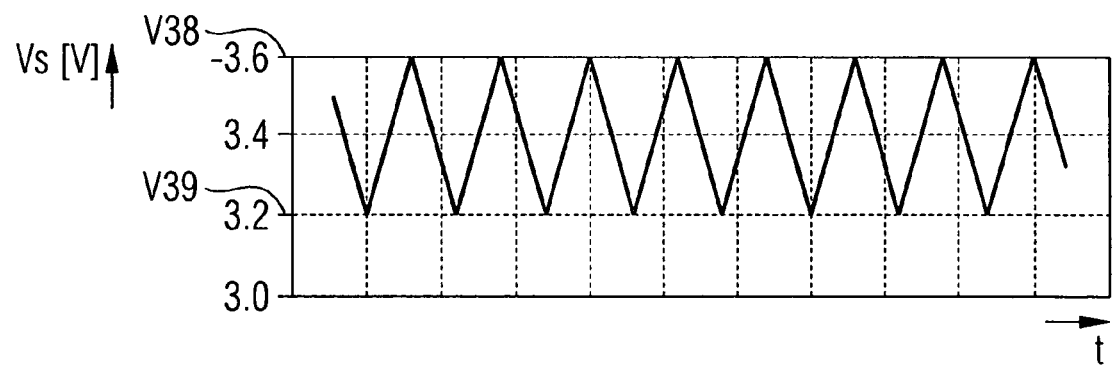

Let us first consider an initial operating state of the switching converter, which corresponds to the normal state and in which a startup phase is completed, and neither an overly high nor overly low load applies. The first and second load signals S41, S42 are at a low level in the initial operating state. In this operating state the charging/discharging circuit 3 drives the capacitor Cs in such a way that it is cyclically charged and discharged, and that the charge state signal Vs cyclically assumes an upper threshold value V38 and a lower threshold value V39. FIG. 3c illustrates the timing behavior of the charge state signal Vs during the initial operating state. The charge state signal Vs is fed to a control input 21 of the oscillator circuit 2 and is used during the normal operating state to vary the frequency of the oscillator signal S2 within specified limits. FIG. 3a shows the time characteristic of the frequency $f_{s2}$ of the oscillating signal S2 according to the charge state signal Vs. The oscillator circuit 2 is designed, for example, as a voltage-controlled oscillator VCO controlled by the charge state signal Vs. The threshold values between which the charge state signal Vs varies may be V38=3.6V and V39=3.2V, for example. The frequency $f_{s2}$ of the oscillating signal S2 varies between 98 kHz and 102 kHz, for example, in response to the charge state signal Vs.

The variation in the frequency of the oscillating signal S2, which defines the clock of the drive signal S1 of the switch M, causes a reduction in the number of electromagnetic disturbances due to the high-frequency switching. A variation in the switching frequency within the limits given above has hardly any effect on the normal behavior of the switching converter, as shown by the timing characteristic of the feedback signal FB in FIG. 3b, which was recorded using a consistent load on the switching converter.

Let us next consider an operating state in which one of the two load signals S41, S42 is set to a high level. During this operating state—referred to hereafter as an exceptional operating state—the charging/discharging circuit 3 drives the capacitor Cs in such a way that it is only charged, starting from its current charge state. The charge state signal Vs is fed along with the oscillating signal S2 to the signal generation circuit 1 and to the first and second operating mode circuits 5, 6. The function of the charge state signal Vs in the signal generation circuit 1, and in the first and second operating mode circuits 5, 6 during an exceptional operating state is explained below.

FIG. 4 shows an example of the charging/discharging circuit 3, which implements the function described above in accordance with the first and second load signals S41, S42.

The charging/discharging circuit 3 consists of a charging/discharging unit with an initial current source 311, an initial switch SWI, a second current source 312 and a second switch SW2, along with a charging unit containing a third switch SW3 and a resistance element 33. The first current source 311 and the first switch SW1 of the charging/discharging unit are connected in series with each other between a terminal for the internal supply potential V1 and a first terminal of the capacitor Cs. The second current source 312 and the second switch SW2 of the charging/discharging unit are connected in series with each other between the first terminal of the capacitor Cs and the reference potential on the primary side. The charging/discharging unit also has a comparator circuit containing an initial comparator 38, whose plus input is fed by the charge state signal Vs, and to whose minus input a reference value is sent that corresponds to the upper threshold value V38 already explained in reference to FIG. 3c. The comparator circuit also has a second comparator 39, whose minus input is fed by the charge state signal Vs, and to whose plus input a second reference value is sent that corresponds to the lower threshold value V39 already explained in reference to FIG. 3c. An output signal S38 from the first comparator 38 is fed to the set input S of an RS flip-flop 35, and an output signal S39 from the second comparator 39 is fed to the reset input R of the same flip-flop 35.

The charging/discharging circuit 3 can have either of two operating states. In one operating state, the charging/discharging unit is activated to cyclically charge and discharge the capacitor Cs, and to generate a triangular charge state signal Vs between the upper threshold value V38 and the lower threshold value V39. The charging unit 33, SW3 is disabled in this first operating state. In a second operating state, the charging/discharging unit is disabled and the charging unit 33, SW3 is activated to continue charging the capacitive storage element Cs from its current charge state.

The operating state setting of the drive circuit 3 depends on the first and second load signals S41, S42. These load signals S41, S42 are fed into an OR gate 34 which outputs a control signal S34 for defining the operating state of the drive circuit 3. This control signal S34 is fed to the switch SW3 of the charging unit 33, SW3 to close the switch whenever the level of the control signal S34 is high. The control signal S34 goes high whenever one of the two load signals S41, S42 goes high—i.e., if the switching converter is in an exceptional operating state.

AND gates 321, 322 are provided to drive the first and second switches SW1, SW2 of the charging/discharging unit. The control signal S34 is inverted by an inverter 37 and fed to an input on each of the AND gates 321, 322. Regardless of the signal applied to the other input on each of the AND gates 321, 322, the output signals S321, S322 of the AND gates 321, 322 go low whenever the control signal S34 is high in order to open the switches SW1, SW2 during the first operating state, thereby disabling the charging/discharging unit.

The charging/discharging unit 3 changes to the second operating state whenever each of the two load signals S41, S42 goes low the control signal S34 is then also low. The charging unit 33, SW3 is disabled during this second operating state, and the charging/discharging unit is activated. In this case, the two switches SW1, SW2 are driven complementary to each other and are opened and closed alternatively. To achieve this effect, the output signal S35 of the flip-flop 35 is, on the one hand, directly fed to the second AND gate 322, while the same output signal S35 of the flip-flop 35 is inverted by an inverter 36 before being input into the first AND gate 321. The flip-flop S35 is set whenever the charge state signal Vs exceeds the upper threshold value V38. As a result, the first switch SW1 is opened and the second switch SW2 is closed to discharge the capacitor Cs. The discharging is ended once the charge state signal Vs has fallen to the value of the lower threshold value V39. The flip-flop 35 is then reset in order to open the second switch SW2, to close the first switch SW1 and to charge the capacitor Cs again. The overall result of these actions is the triangular signal shape of the charge state signal Vs shown in FIG. 3c.

As already explained, the charge state signal Vs is used during the normal operating state of the drive circuit or switching converter—when the charging/discharging circuit is in the initial operating state and generating a triangular charge state signal—as a drive signal for the oscillator circuit 2 to generate an oscillating signal with varying frequency.

If the operating state is the exceptional state, a rising ramp-shaped charge state signal Vs is generated in the way just described. Here the maximum value of the charge state signal Vs is limited to the value of the internal supply potential V1. Three different exceptional operating states are distinguished for the drive circuit illustrated in FIG. 1. They are described in the following.

The drive circuit in the startup phase is in an initial exceptional operating state. The output voltage Vout is zero or very low so that the feedback signal FB adopts a value above the limit value V41. The first load signal S41 then goes high to change the charging/discharging circuit 3 to the second operating state. The charge state signal Vs is used during the first exceptional operating state to limit the current Im flowing through the switch M in the signal generation circuit 1.

FIG. 5 shows an example of a signal generation circuit 1 of this kind with the function of limiting the input current Im in relationship to the charge state signal Vs during this first exceptional operating state.

This signal generation circuit 1 comprises an RS flip-flop 12, to whose set input S the oscillating signal S2 is fed.

During this phase of operation the oscillator signal S2 may have minimum frequency, 96 kHz for example. After the non-inverting output Q of the flip-flop 12 is a driving circuit 11 that converts the logic signals at the output of the flip-flop to the drive signal S1. The drive signal has a level suitable for driving the switch M implemented in the form of a power transistor. The flip-flop 12 is set synchronously to the clock signal S2 to activate the switch M. After the activation period Ton has expired, the flip-flop 12 is reset by a reset signal S14 applied to the reset input R of the flip-flop 12. This reset signal S14 is at the output of an OR gate 14. Three input signals S131, S15, S17 are input into the OR gate 14: they are used in different operating states to set the duty cycle of the drive signal S1.

During the first exceptional operating state, the duty cycle of the drive signal Si is set by an initial input signal S131 provided at the output of an AND gate 131. An output signal S13 of an initial comparator 13 is fed to an input of the AND gate 131. The current measuring signal CS is fed to the plus input of the comparator 13, the charge state signal Vs to the minus input. The second comparator signal S39 of the charging/discharging circuit 3 is fed to another input of the AND gate 131. This second comparator signal S39 remains high during the startup phase until the charge state signal Vs has risen to the value of the lower threshold value V39. After activation of the switch M, the flip-flop 12 is reset during the rise time by means of the output signal S13 of the comparator 13 to open the switch M each time the current measuring signal CS reaches the current value of the rising charge state signal Vs or the feedback signal FB. The charge state signal Vs is therefore used to limit the input current Im during the startup phase. The startup phase is concluded when the charge state signal Vs has risen to the value of the lower threshold value V39. At this time, the current limiting circuit composed of the comparator 13 and the AND gate 131 is disabled.

FIG. 6 shows the timing behavior of the output voltage Vout, the feedback signal FB and the charge state signal Vs during the startup phase which begins at a time t0. As can be seen from FIG. 6, directly after the activation time t0, the feedback signal FB reaches a value above the initial limit value V41. As a consequence, the charging/discharging circuit 3 is driven in such a way that the capacitor Cs is charged by the charging circuit 33, SW3. The charge state signal Vs rises over time, beginning at the activation time t0, and is used as described in the signal generation circuit 1 to limit the load current Im. The duty cycle of the drive signal S1 increases over time, which causes the output voltage Vout to likewise rise over the same time. If the charge state signal Vs reaches a threshold value specified in the example by the lower threshold value V39 of the charging/discharging circuit 3, the current limitation ceases and the switch remains open (or closed) after activation until the current measuring signal CS rises to the value of the feedback signal FB. Consequently, the output voltage Vout quickly rises to its final value, and the feedback signal FB falls to a value below the first load limit value V41. When the feesback signal FB falls below a certain value, the charging/discharging circuit 3 then changes to the first operating state in which the capacitor Cs is cyclically charged to the upper threshold value V38 and discharged to the lower threshold value V39.

Another comparator 15 in the signal generation circuit 1 (see FIG. 5) is used to set the duty cycle during this normal operating state. The comparator 15 compares the current measuring signal CS with the feedback signal FB and provides an output signal S15, which goes high to reset the flip-flop 12 through the OR gate 14 when the current measuring signal CS reaches the value of the feedback signal FB.

The drive circuit 100 enters a second exceptional operating state when the startup phase is concluded, but the feedback signal FB nonetheless is at a level above the first load limit value V41. Such a high level of the feedback signal FB indicates either an overload in the switching converter or a break in the open loop. In both cases, further driving of the switch M must be suppressed at least for a while in order to prevent overloading of the switching converter. This suppression of the driving of the switch M in overload cases is implemented in the drive circuit 100 as illustrated in FIG. 1 using the first operating mode circuit 5, to which the first load signal S41 and the charge state signal Vs are fed, and which outputs an initial operating mode signal S5 that is fed to a power supply circuit 7 in the drive circuit 100. This power supply circuit 7 is the source of the internal power supply to the drive circuit 100 and also provides all reference voltages required in the circuit. If the operating mode circuit 5 detects an overload in the switching converter on the basis of the first load signal S41 and the charge state signal Vs, it interrupts the power supply to the drive circuit 100 with the first operating mode signal S5 to suppress further driving of the switch M.

Figure 7B:
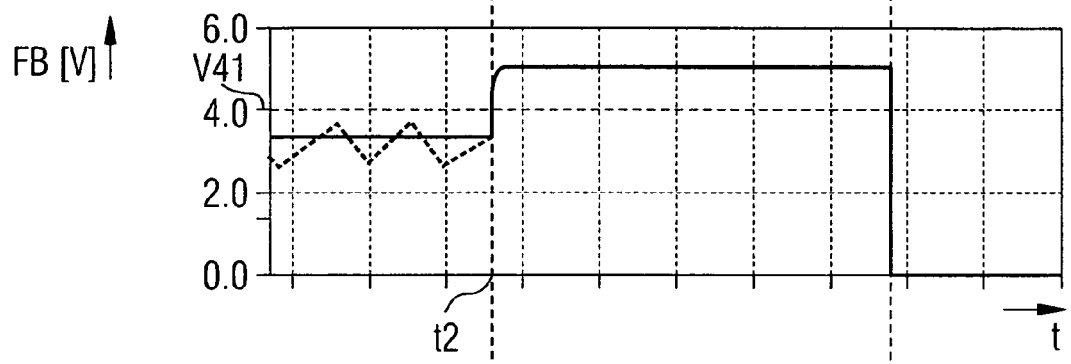
Figure 7C:
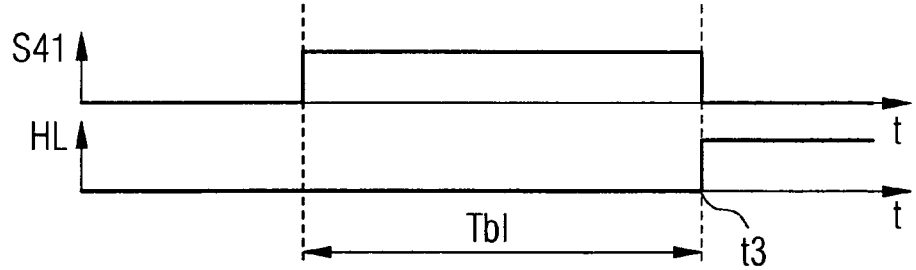

The supply voltage will then decrease. If the supply voltage falls below a given voltage startup cell will start recharging the capacitor C3 in order to increase the supply voltage. If the voltage reaches a given upper voltage level the system will restart. Signal refint in FIG. 6b is an internal signal in the power supply circuit 7 which indicates if the supply voltage reaches the upper voltage level. The functioning of such startup cell is described in the above CoolSET™-F2 data sheet. FIG. 7b shows the timing behavior of the feedback signal FB for an overload case occurring at the time t2, the result of which is that the feedback signal FB rises above the load limit V41. The subsequent behavior of the first load signal S41 is depicted in FIG. 7c. Before the time t2, the feedback signal FB is in the range defined by the first and second load limits V41, V42, and as such the charging/discharging circuit 3 is in the first operating state and the capacitor Cs cyclically charges and discharges. At the time t2 and on rising of the feedback signal FB above the first load limit V41, the charging circuit changes to the second operating state, and permanently charges the capacitor Cs starting from the value at the time t2 which is between the lower and upper threshold values V38, V39.

With regard to FIG. 8, the rise in the charge state signal Vs in the first operating mode circuit 5 serves as a time reference signal for evaluating the first load signal S41. The first operating mode circuit 5 has a comparator 51, to which the charge state signal Vs and a reference value V51 are fed. This reference value V51 is larger than the upper threshold value V38, to which the charge state signal Vs cyclically rises during the normal operating state. An output signal S51 from the comparator 51 goes high whenever the charge state signal Vs rises to the threshold value V51. An AND gate 52 compares the output signal S51 of the comparator 51 with the first load signal S41.

In the example given in FIG. 7, the feedback signal FB permanently remains above the first load limit V41 after the second time, t2. Consequently, the charge state signal Vs rises continuously from the time t2. A signal HL at the output of the AND gate 52 see FIG. 8 goes high at a time, t3, at which the charge state signal Vs has risen to the limit value V51, and at which time the feedback signal FB is still above the second load limit V41. This high level of the signal HL indicates a threatening overload in the switching converter. This overload signal HL is fed to a processing circuit 53, which drives the power supply circuit 7 using the first operating mode signal S5 in such a way that the power supply of the drive circuit 100 is interrupted and further driving of the switch M is prevented.

In reference to FIG. 7, while the feedback signal FB indicates an overload or an open feedback loop as early as during the second time period, t2, the switching converter is not switched off until after a delay of Tm at a time t3. This ensures that brief fluctuations in the feedback signal FB do not cause the drive circuit 100 to be disabled. If the feedback signal FB would fall below the value of the first load limit V41 again before the charge state signal Vs has risen to the threshold value V51, the charging/discharging circuit 3 would be set to its initial operating state and the drive circuit would again switch to the normal operating state. The period TM between occurrence of the overload case and the actual disabling of the switching converter is referred to as the masking period Tm. The length of this masking period Tm depends on the difference between the threshold value V51 and the current value of the charge state signal Vs, and also on the load current of the capacitor Cs. Assuming that the voltage range of the charge state signal Vs, which derives from the difference between the upper and lower threshold values V38, V39, is considerably lower than the difference between the threshold value V51 and the upper or lower threshold value as applicable, an approximately constant masking period Tm is achieved regardless of whether the value of the charge state signal Vs at the time t2 is closer to the lower V39 or upper threshold value V38.

It is to be noted that due to variable operation frequency and system regulation principle, the feedback signal FB, which serves for regulating the output voltage Vout, usually will have some saw waveform, which is despicted in dashed lines in FIG. 7b.

The drive circuit 100 shown in the FIG. 1 can have a third exceptional operating state. This state occurs if the feedback signal FB takes on a value below the second load limit V42. During this third exceptional operating state, there is very low load on the switching converter, and the drive circuit goes into so-called burst mode. During this burst mode the switch M is synchronously driven only at certain periods. The transition of the drive circuit 100 to the burst mode is implemented by the second operating mode circuit 6, to which the second load signal S41 and the charge state signal Vs are fed.

FIG. 9b shows the example of the timing behavior of the feedback signal FB in a load scenario in which there is a drop in load at a time t4, which causes the feedback signal FB to fall below the second load limit V42. For the rest of the time, although the feedback signal FB rises, it remains in total below the second load limit V42. As of the time t4, the charging/discharging circuit driven by the load signal S42 switches to its second operating state to continuously charge the capacitor Cs, starting from its current value, until the second load signal S42 goes high. This rising charge state signal Vs is used in the second operating mode circuit 6 to determine a masking period, at the end of which the second operating mode circuit 6 generates a second operating mode signal S6, which causes the drive circuit 100 to enter burst mode.

This second operating mode circuit 6 includes reffering to FIG. 10 a further comparator 63, to which the charge state signal Vs and a threshold value signal V63 are fed, and which outputs a comparator signal S63. The comparator output signal S63 and the second load signal S42 are input into an AND gate 64, which outputs a low load signal LL. This low load signal LL goes high if the second load signal S42 has a high level when the charge state signal Vs has risen to the upper threshold value V63. This low load signal LL is fed to an evaluation circuit 65, which provides the second operating mode signal S6 for controlling the burst mode.

The second operating mode circuit 6 includes further comparators 61, 62 into each of which the feedback signal FB and an upper and a lower threshold value V61, V62 are input. These comparators output comparator signals S61, S62, which are also fed to the processing circuit 65. These comparator signals S61, S62 are used during burst mode to define the periods during which the switch M is to be driven according to a clock, and the periods during which there is to be no driving of this kind. In general, it is the case that the output voltage rises for a low load and synchronous clock driving of the switch M, which causes the feedback signal FB to fall. If the driving of the switch M is interrupted and if the input power of the load persists, the output voltage Vout falls and the feedback signal FB rises. This behavior results in a triangular waveform of the feedback signal FB during burst mode, as shown on the right side of FIG. 9b. The threshold values V61, V62 define the limits at which synchronous clock driving of the switch M begins or ends. In the example shown, the synchronous clock driving of the switch begins whenever the feedback signal FB has risen to the upper limit value V61. The switch continues to be driven with a clock until the feedback signal FB falls to the lower threshold value V62. The driving of the switch M is interrupted until the feedback signal FB has again risen to the upper threshold value V61. The evaluation circuit 65 of the second operating mode circuit 6 analyzes the signals S61, S62 and the low load signal LL in order to generate an appropriate operating mode signal S6.

With reference to FIGS. 1 and 5, this second operating mode signal S6 is fed to the signal generation circuit 1. The second operating mode signal S6 goes high in burst mode if the switch M is to be driven using a clock, and goes low in burst mode if the switch is not to be driven. This second operating mode signal S6 is fed in the signal generation circuit 1 to another AND gate 17. A comparator signal S16 at the output of another comparator 16 is fed to the other input of the AND gate 17. The current measuring signal CS or the sense signal CS', respectively, enters the plus input of the comparator 16, while a reference signal V16 is fed to the minus input of the same comparator. The value of the reference signal V16 is lower than that of the feedback signal FB in burst mode—i.e., lower than the upper and lower threshold values V61, V62 shown in FIG. 9. This low reference value (which is V16=0.25V for example) effects very short activation times in burst mode in that, after activation of the switch M, the flip-flop 12 is reset as early as when the current measuring signal CS or the sense signal CS' has risen to the low reference value V16. Resetting of the flip-flop 12 through the comparator signal S16 is prevented outside burst mode by the operating signal S6 going low, which causes the output signal S17 of the AND gate to permanently go low.

FIG. 11 shows an example of a circuit implementation of the feedback circuit 8 illustrated in FIG. 1. This feedback circuit 8 includes a potential divider 81, 82 to which the output voltage Vout is applied, and an optocoupler 89 with an output providing the feedback signal FB. A filter is connected between the potential divider 81, 82 and an output of the optocoupler 89. The purpose of the filter is to filter the noise in the feedback signal. It is to be noted that FIG. 11 shows only one of many different filters to be used for this purpose.

FIG. 12 depicts a circuit diagram in which components of some of the described functional groups for the drive circuit shown in FIG. 1 are represented together for easier comprehension.

FIG. 12 schematically shows some additional circuits the function of which has not been described so far. However using these circuits in CM switching converters and their function is generally known.

Circuit 193 which via input 103 is connected to current sense resistor (Rs in FIG. 1) performs leading edge blanking. Turning on the power switch (M in FIG. 1) results to switching curretn noise in the signal CS'. In order to prevent these noise from disturbing proper functioning of the system, circuit 193 blanks signal CS' for a given time periode after the switch turns on.

Circuit 191 serves for propagation delay compensation.

Furthermore, additional functionality, thermal shutdown for example, may be implemented. "Thermal shutdown" means when chip temperature is more than certain value, the system will be shut down.

The additional AND gate 54 in FIG. 12 the output of which is connected to OR gate 34 and the input of which is connected to evaluation circuit 65 serves for stopping, charging and discharging of the capacitor Cs during burst mode. After system goes out of the burst mode operation, charging and discharging of Vs capacitor will be recovered.

REFERENCE SIGNS

C1 input capacitor
C2, C4 capacitors
C3 capacitor
CS current measuring signal
D1-D4 diodes
D5, D6 diodes
FB feedback signal
HL high load signal
K1, K2 input terminals
K3, K4 output terminals
L1 primary winding (coil)
L2 secondary winding (coil)
L3 auxiliary winding
L4 coil, inductor
LL low load signal
M switch, power transistor
R1 resistor
Rfb resistor
Rs current sensing resistor
S1 drive signal
S14 output signal of the OR gate
S15, S16 comparator output signals
S17 output signal of the AND gate
S2 oscillating signal S34 control signal
S37 inverter output signal
S41 first load signal
S42 second load signal
S5 first operating mode signal
S51 comparator output signal
S53 flip-flop output signal
S6 second operating mode signal
S61-S63 comparator output signals
SW1-SW3 switch
TR transformer
V1 internal power supply
V16 reference value
V38, V39 threshold values
V41 first load limit
V42 second load limit
V51 reference value
V61, V63 reference value
Vc2 voltage
Vin input voltage
Vn mains voltage
Vout output voltage
Vs charge state signal
101-104 drive circuit terminals
61-63 comparators
1 signal generation circuit
2 oscillator circuit
3 charging/discharging circuit
4 evaluation circuit
5 first operating mode circuit
6 second operating mode circuit
8 feedback circuit
12 output driver
12 RS flip-flop
14 OR gate
17 AND gate
34 OR gate
35 RS flip-flop
13, 15, 16 comparators
51 comparator
53 evaluation circuit
65 evaluation circuit
36, 37 inverter
38, 39 comparator output signals
41, 42 comparators
86 thyristor
89 optocoupler
91 bridge rectifier
92 output stage
105 power connection for the drive circuit
131 AND gate
81, 82 potential divider
84, 85 capacitors
83, 87, 88 resistors
311, 312 current sources
321, 322 AND gate

The invention claimed is:

1. A drive circuit for providing a drive signal to a switch in a switching converter, the switching converter having output terminals for providing an output voltage, and in which a feedback signal that corresponds to the output voltage is available, the drive circuit comprising:
a capacitive storage circuit;
a charging/discharging circuit connected to a first terminal of the capacitive storage circuit, the charging/discharging circuit configured to receive as inputs at least one load signal, the at least one load signal adopting at least a first and second state, the charging/discharging circuit further configured to charge and discharge the capacitive storage circuit cyclically in the first state between a first limit value and a second limit value, and to only charge the capacitive storage circuit in the second state;
a load signal generation circuit configured to generate the at least one load signal responsive to the feedback signal, wherein the at least one load signal indicates a normal load condition or an overload/open feedback loop condition of the switching converter;
at least a first operating mode circuit coupled to receive a charge state signal that corresponds to a charge state of the capacitive storage circuit, and to receive the at least one load signal, the first operating mode circuit configured to set a normal operating state or an exceptional operating state of the drive circuit in accordance with the at least one load signal and the charge state signal, wherein the operating mode circuit sets the exceptional state only if the charge state signal reaches a reference value that is higher than the first limit value, and if the at least one load signal indicates the overload/open feedback loop condition;
an oscillator circuit operably coupled to receive the charge state signal, and configured to provide an oscillating signal having a frequency that varies according to the charge state signal; and
a drive signal generation circuit configured to generate the drive signal based at least in part on the oscillating signal and the feedback signal.

2. A drive circuit as claimed in claim 1, wherein the load signal generation circuit is configured to provide a first load signal and a second load signal to the charging/discharging circuit.

3. A drive circuit as claimed in claim 2, further comprising a second operating mode circuit configured to receive the charge state signal and the second load signal, and configured to set a second operating state of the drive circuit responsive to the charge state signal and the second load signal.

4. A drive circuit as claimed in claim 1, wherein the load signal generation circuit includes a first comparator circuit configured to generate a first load signal responsive to a comparison of the feedback signal and a first load limit.

5. A drive circuit as claimed in claim 4, wherein the load signal generation circuit includes a second comparator circuit configured to generate a second load signal responsive to a comparison of the feedback signal and a second load limit.

6. A drive circuit as claimed in claim 1, further comprising a power supply circuit configured to supply bias power to at least part of the drive circuit.

7. A drive circuit as claimed in claim 6, wherein the first operating mode circuit is operably connected to the power supply circuit.

8. A drive circuit as claimed in claim 3, wherein the second operating mode circuit is operably connected to the drive signal generation circuit.

9. A drive circuit as claimed in claim 1, wherein the capacitive storage circuit comprises a capacitor.

10. A drive circuit for providing a drive signal to a switch in a switching converter, the switching converter having output terminals for providing an output voltage, and in which a feedback signal that corresponds to the output voltage is available, the drive circuit comprising:
a capacitive storage circuit;
a charge control circuit connected to a first terminal of the capacitive storage circuit, the charge control circuit configured to receive as inputs at least one load signal, the at least one load signal adopting at least a first and second state, the charge control circuit further configured to charge and discharge the capacitive storage circuit cyclically in the first state, and to only charge the capacitive storage circuit in the second state;

a load signal generation circuit configured to generate the at least one load signal responsive to the feedback signal, wherein the at least one load signal indicates a normal load condition or an overload/open feedback loop condition of the switching converter;

at least a first operating mode circuit coupled to receive a charge state signal that corresponds to a charge state of the capacitive storage circuit, and to receive the at least one load signal, the first operating mode circuit configured to generate a first drive circuit control signal in accordance with the at least one load signal and the charge state signal, wherein the drive circuit enters an exceptional state only if the charge state signal reaches a reference value that is higher than a first limit value and if the at least one load signal indicates the overload/open feedback loop condition;

an oscillator circuit operably coupled to receive the charge state signal, and configured to provide an oscillating signal having a frequency corresponding to the charge state signal; and a drive signal generation circuit configured to generate the drive signal based at least in part on the oscillating signal and the feedback signal.

11. A drive circuit as claimed in claim 10, wherein the load signal generation circuit is configured to provide a first load signal and a second load signal to the charge control circuit.

12. A drive circuit as claimed in claim 11, further comprising a second operating mode circuit configured to receive the charge state signal and the second load signal, and configured to generate a second drive circuit control signal responsive to the charge state signal and the second load signal.

13. A drive circuit as claimed in claim 10, wherein the load signal generation circuit includes a first comparator circuit configured to generate a first load signal responsive to a comparison of the feedback signal and a first load limit.

14. A drive circuit as claimed in claim 13, wherein the load signal generation circuit includes a second comparator circuit configured to generate a second load signal responsive to a comparison of the feedback signal and a second load limit.

15. A drive circuit as claimed in claim 10, wherein the first drive circuit control signal has at least one state configured to cause bias power to be reduced in at least part of the drive circuit.

16. A drive circuit as claimed in claim 15, further comprising a power supply circuit configured to supply bias power to at least part of the drive circuit.

17. A drive circuit as claimed in claim 16, wherein the first operating mode circuit is operably connected to provide the first drive circuit control signal to the power supply circuit.

18. A drive circuit as claimed in claim 12, wherein the second operating mode circuit is operably connected to provide the second drive circuit control signal to the drive signal generation circuit.

19. A drive circuit as claimed in claim 10, wherein the capacitive storage circuit comprises a capacitor.

20. A drive circuit for providing a drive signal to a switch in a switching converter, the switching converter having output terminals for providing an output voltage, and in which a feedback signal that corresponds to the output voltage is available, the drive circuit comprising:

a capacitive storage circuit;

a charge control circuit connected to a first terminal of the capacitive storage circuit, the charge control circuit configured to receive as inputs at least one load signal, the at least one load signal adopting at least a first and second state, the charge control circuit further configured to charge and discharge the capacitive storage circuit cyclically in the first state, and to only charge the capacitive storage circuit in the second state;

a load signal generation circuit configured to generate the at least one load signal responsive to the feedback signal;

a first operating mode circuit coupled to receive a charge state signal that corresponds to a charge state of the capacitive storage circuit, and to receive a first control signal corresponding to at least a first of the at least one load signal, the first operating mode circuit configured to generate a first drive circuit control signal in accordance with the first control signal and the charge state signal, the first drive circuit control signal having at least one state configured to cause bias power to be reduced in the drive circuit;

a second operating mode circuit configured to receive the charge state signal and the second load signal, and configured to generate a second drive circuit control signal responsive to the charge state signal and the second load signal;

an oscillator circuit operably coupled to receive the charge state signal, and configured to provide an oscillating signal having a frequency corresponding to the charge state signal; and a drive signal generation circuit configured to generate the drive signal based at least in part on the oscillating signal and the feedback signal.

* * * * *